United States Patent [19]

Kramer et al.

[11] Patent Number: 5,191,650
[45] Date of Patent: Mar. 2, 1993

[54] VIRTUAL CHAINS FOR SESSION INITIATION IN A DISTRIBUTED COMPUTER NETWORK

[75] Inventors: Dirk K. Kramer; Michael A. Lerner, both of Raleigh, N.C.

[73] Assignee: International Business Machines Corporation, Armonk, N.Y.

[21] Appl. No.: 393,923

[22] Filed: Aug. 16, 1989

[51] Int. Cl.⁵ .............................................. G06F 13/00
[52] U.S. Cl. ................................ 395/200; 364/284.4; 364/242.9; 364/DIG. 1
[58] Field of Search ... 364/200 MS File, 900 MS File

[56] References Cited

U.S. PATENT DOCUMENTS

4,466,060 8/1984 Riddle ................................. 364/200
4,914,571 4/1990 Baratz et al. ...................... 364/200

Primary Examiner—Gareth D. Shaw
Assistant Examiner—A. Katbab
Attorney, Agent, or Firm—John J. Timar

[57] ABSTRACT

A method for establishing and maintaining virtual chains in a distributed computer network during session initiation. In transmitting a session initiation request from an originating network node to a destination network node, a locate chain is established along the path taken with control block resources dedicated to the chain at each intermediate node. By sending a reply with the discard indicator set, the resources at the intermediate nodes become immediately available and only the network node servers maintain knowledge of the pending session initiation and the route selected.

13 Claims, 6 Drawing Sheets

VIRTUAL CHAINS FOR SESSION INITIATION IN A DISTRIBUTED COMPUTER NETWORK

REFERENCE TO RELATED APPLICATIONS

This invention is related to the following co-pending applications filed on Jun. 15, 1987 and having the same assignee. U.S. patent application Ser. No. 062,269 now U.S. Pat. No. 4,914,571 by A. E. Baratz et al, entitled "Locating Resources in Computer Networks," discloses a technique for locating devices and other resources (programs, databases, etc.) in computer networks. U.S. patent application Ser. No. 062,280, now U.S. Pat. No. 5,109,483 by A. E. Baratz et al, entitled "Method for Disseminating Network State Information," discloses a technique for facilitating the flow of control information between nodes in networks capable of distributed control.

BACKGROUND OF THE INVENTION

The present invention relates to computer networks and, more particularly, to a method for establishing and maintaining virtual chains in a distributed network during the session initiation process.

Computer networks for processing and transmitting data are typically hierarchical by nature, with the network operating system owning all resources in the network and being responsible for initiating sessions, determining routes, and terminating sessions. In contrast to the master-slave relationship characteristic of a hierarchical network, the nodes in a network utilizing a peer-to-peer architecture are capable of selecting routes and initiating sessions without intervention from a central host. The peer-to-peer network architecture is particularly suitable for dynamic networks in which the addition and deletion of resources and end users occurs very frequently. This architecture relies on a combination of dynamically maintained topology databases and automatic path computation to eliminate the need for manual definition of the network physical configuration and to provide for automatic adaptation to configuration changes. U.S. Pat. No. 4,827,411 issued to Arrowood et al discloses a method for maintaining a common network topology database at different nodes in a communications network.

A communications network can be defined generally as a collection of network nodes and end nodes interconnected through communication links or transmission groups. A network node can be characterized as a data processing system that provides certain functions within the network, such as routing of messages between itself and its adjacent or neighboring nodes, selection of routes for messages to be transmitted between a network node and an end node and the furnishing of directory services to connected end nodes. An end node is a node that does not provide any network services to other nodes. End nodes are exemplified by devices such as display terminals, intelligent workstations, printers and the like which do not provide routing or route selection or directory services to other nodes and networks. The links between nodes may be permanent communication links such as conventional cable connections or links that are enabled only when needed, such as dial-up telephone connections. Collectively, the network nodes, the end nodes and the transmission groups between the nodes are referred to as network resources. The physical configuration and characteristics of the various nodes and links in a network are said to be the topology of the network.

An end user's interface to the network is referred to as a logical unit. A logical unit is a device or program that an end user uses to access the network. Two end users communicate over a logical connection called a session. Multiple sessions can exist between logical units. The logical unit that establishes the session is referred to as the primary logical unit (PLU); the other logical unit is referred to as the secondary logical unit (SLU). Each end node and network node typically supports one or more logical units. In addition, each end node and network node contains a control point (CP) that provides control functions such as session initiation and termination. Control points communicate with each other via CP-CP sessions. The domain of each network node consists of the logical units, physical units, and control points under its control. The basic session establishment function in a peer-to-peer network architecture is primary logical unit initiated without queueing, although secondary logical unit and third party initiated sessions and various forms of queueing can also be supported on both end nodes and network nodes.

A network node provides directory services to the logical units located on it and to the logical units on the end nodes that it serves. The network node directory contains a mapping of logical unit names or other resource names to the control point (CP) name of the node at which that logical unit or resource is located. The network node's directory functions include learning the resources in its end node either by definition or registration by the end nodes, maintaining a cache of directory entries that it has learned, sending a directed search to verify the existence and location of a resource, and initiating a broadcast search across the network if there is no information on where the resource is located. To initiate a session with a logical unit in the domain of another network node, a logical unit must first send a session initiation request to the control point in its serving network node requesting that a particular session be established. The control point in the serving network node forwards the cross-domain session initiation request along with a directed search message to the destination network node believed to contain the target logical unit.

To accommodate the capability of dynamically locating resources in a peer-to-peer network architecture, the directory services component in each network node has a number of control blocks for storage dedicated to the receipt and processing of directory search requests. Each intermediate node between the originating network node server and the destination network node server must also use control blocks for forwarding messages and receiving replies. If a large number of search messages and replies are active simultaneously, one or more intermediate nodes can be hampered in the ability to perform other processing functions due to an insufficient amount of available storage area. In transmitting a directed search request from an originating network node to a destination network node, a "locate chain" is established along the path taken with resources in the form of control blocks dedicated to the chain at each intermediate node along the path until session initiation is complete. There exists a need for a method to reduce the amount of storage dedicated to intermediate nodes during session initiation.

SUMMARY OF THE INVENTION

It is thus an object of this invention to provide a method for reducing the amount of storage needed at intermediate nodes during the session initiation process.

It is a further object of this invention to provide a method for reducing the amount of time during which control blocks are used at the intermediate nodes during the session initiation process.

It is a still further object of this invention to provide a method for initiating message transfer between network nodes that can accommodate either virtual circuit or datagram transmissions.

These and other objects are accomplished by a method in which the "locate chain" is replaced by a "virtual chain". With a virtual chain, the intermediate network nodes do not dedicate resources to the locate chain for the entire period of time required for the session to be initiated. The virtual chain is set up as a result of the initial logical unit to logical unit session initiation request. It is maintained by the network node servers involved in the session initiation while monitoring their respective topology databases. Additional session set up messages can be sent over the virtual chain as required. The virtual chain is disconnected when the session is initiated successfully, or when the session initiation is aborted.

DETAILED DESCRIPTION OF THE PREFERRED EMBODIMENT

Figure 1:
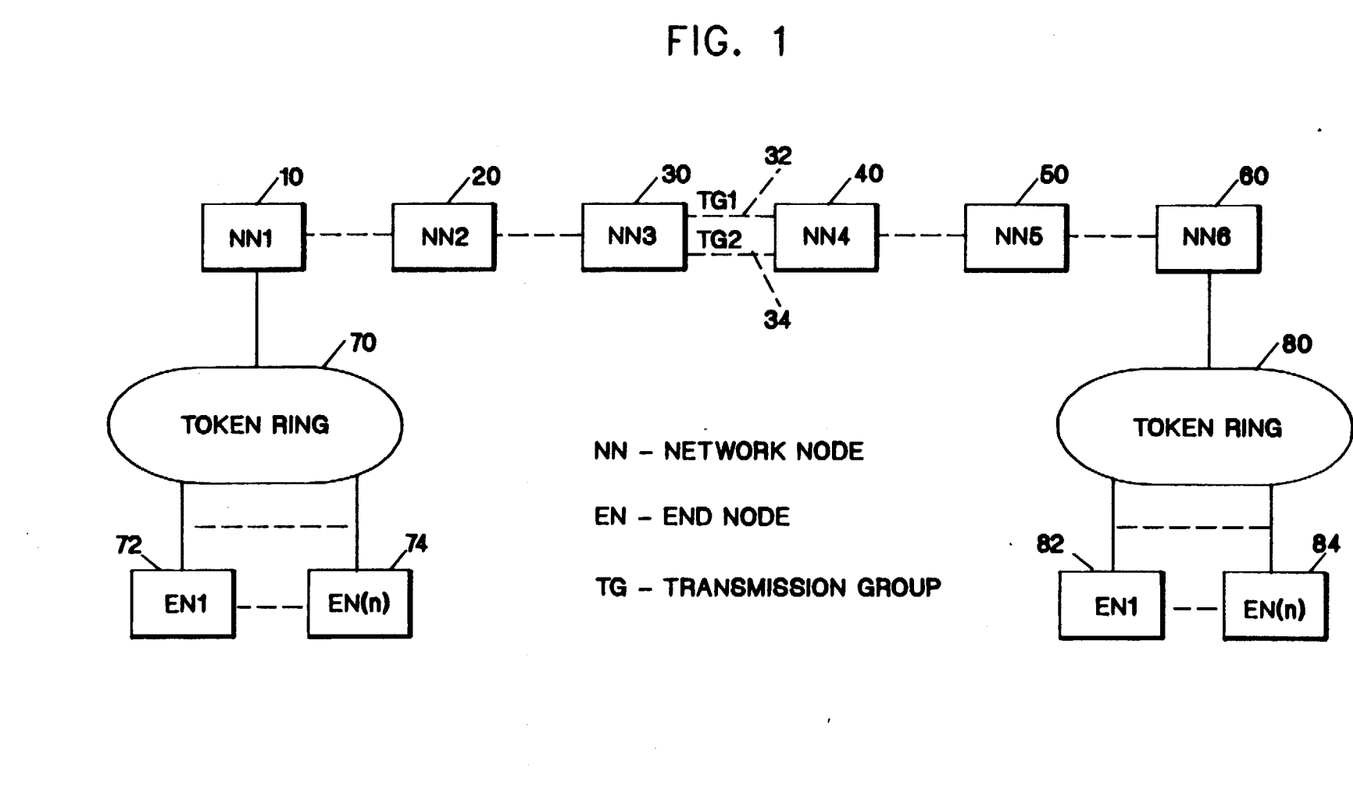
FIG. 1 is a block diagram of a representative communications network within which the present invention may be practiced.

FIG. 1 shows a portion of a representative communications network containing six network nodes identified by reference numerals 10, 20, 30, 40, 50, 60 which are linked by transmission groups. The links between network node NN3 and network node NN4 are TG1 identified by numeral 32 and TG2 identified by numeral 34. Each communications link may be either a permanent connection or a selectively enabled connection. Shown attached to network node NN1 via token ring 70 are up to n end nodes labeled 72, 74. Similarly, up to m end nodes 82, 84 are connected to network node NN6 via token ring 80. In practice, other network nodes might also have end nodes attached. Although the end nodes are shown connected to network nodes through token rings, they could also be connected directly to the network nodes.

The network nodes NN1 through NN6 are data processing systems that provide certain communications services for their own end nodes and for other network nodes. The communications services provided by a network node include, among other things, the selection of communications routes between nodes, directory services and the maintenance of a network topology database, which the network node must have in order to determine the most appropriate route between nodes. The topology database includes each of the network nodes and each link associated with one of the network nodes. Each of the links in the network is defined in two different directions. The dual definition of link direction reflects the fact that the links are owned by different nodes, depending on the link direction used in setting up routes.

Each active network node will periodically generate a topology database update (TDU) message and will broadcast that message to other network nodes. A TDU message is produced and broadcast by the responsible network node when the node is first added to or reconnected to the network, and each time the status of the resource changes. Any network topology change such as a link activation, link failure or even a sufficient change in link characteristics results in an update of the topology database at the node where the change occurs. Each network node is capable of processing TDU messages received from other nodes in order to maintain its local copy of the topology database and broadcasting the TDU message to neighboring nodes.

The directed LOCATE is a message that nodes exchange in an effort to locate a destination resource. The general format of LOCATE messages and the methods for locating resources in a communications network are described in the above-referenced patent of Baratz et al, U.S. Pat. No. 4,914,571, and is incorporated herein by reference. A significant feature of the LOCATE message is that it is independent of other functions which may be performed by other messages that accompany the LOCATE message during the searching process, such as initiating the BIND or notifying a node of the availability of a resource.

Directed searches are sent by the network node control point of the originating logical unit to the network node control point of the destination logical unit. A route selection control vector (RSCV) is computed that indicates the concatenation of CP-CP sessions that are traversed. Each intermediate network node along the path, after determining that it is not the destination node, forwards the directed locate message to the next network node control point in the RSCV and does not search its domain resources directory for the search argument resource. In the event that an intermediate network node control point is unable to route the directed LOCATE message, a negative reply, LOCATE (discard), is returned. The destination control point searches its domain resources directory for the search argument resource and, if not found, will search end nodes capable of receiving directed search messages for the resource type. If the resource still has not been found, a negative reply is returned.

When a LOCATE request message is sent through the network, information must be retained at the intermediate nodes in the search path for routing the search reply. The LOCATE request message carries a procedure status indicator that controls the creation and maintenance of control blocks at the intermediate nodes in the search path. These control blocks are used only as a path to return the search reply and are destroyed once the reply has been forwarded. The search request is sent on a message with a LOCATE (keep). The "keep" status indicator causes each node along the path to retain information in control blocks pointing to the node from which it received the LOCATE message and the node to which it forwarded the message. The information retained in the control blocks insures that the LOCATE reply can be routed back to the origin.

Once the destination returns a search reply, there is no need to retain the addressability between the origin and destination network nodes. The destination network node returns a LOCATE (discard) in the search reply message indicating that the control blocks should be discarded. Each intermediate node forwards the LOCATE (discard) and destroys its control blocks for the search.

Each directed search message carries a unique identifier called a fully-qualified procedure correlation identifier (FQPCID) that is assigned by the originating node. The FQPCID is used by a node to correlate a search reply with a search request. When a node originates a directed search, it generates a procedure correlation identifier (PCID) that is locally unique and adds to the front of the PCID its control point name. Yielding the FQPCID. Since control point names are unique within the network, each FQPCID is also unique.

A session is activated by transmitting a special set-up message, called a BIND, over the path that the session is to follow. The BIND contains the name of the session origin (OLU), the session destination (DLU), and the route description (RSCV). It is transmitted a hop at a time with each node using the route description to determine the next hop. As the BIND passes through each network node, it leaves behind table entries called session connectors that cause subsequent message packets that belong to the particular session to always follow the same path. When the BIND arrives at the destination logical unit, certain parameter settings are negotiated between the logical units, and then the ELU sends a BIND RESPONSE message to the OLU. This response is routed according to the identifiers that have been left to the intermediate nodes as the BIND message was transmitted. For purposes of the ensuing discussion, the logical unit transmitting the BIND is referred to as a primary logical unit (PLU), and the logical unit receiving the BIND is referred to as the secondary logical unit (SLU).

Figure 2:
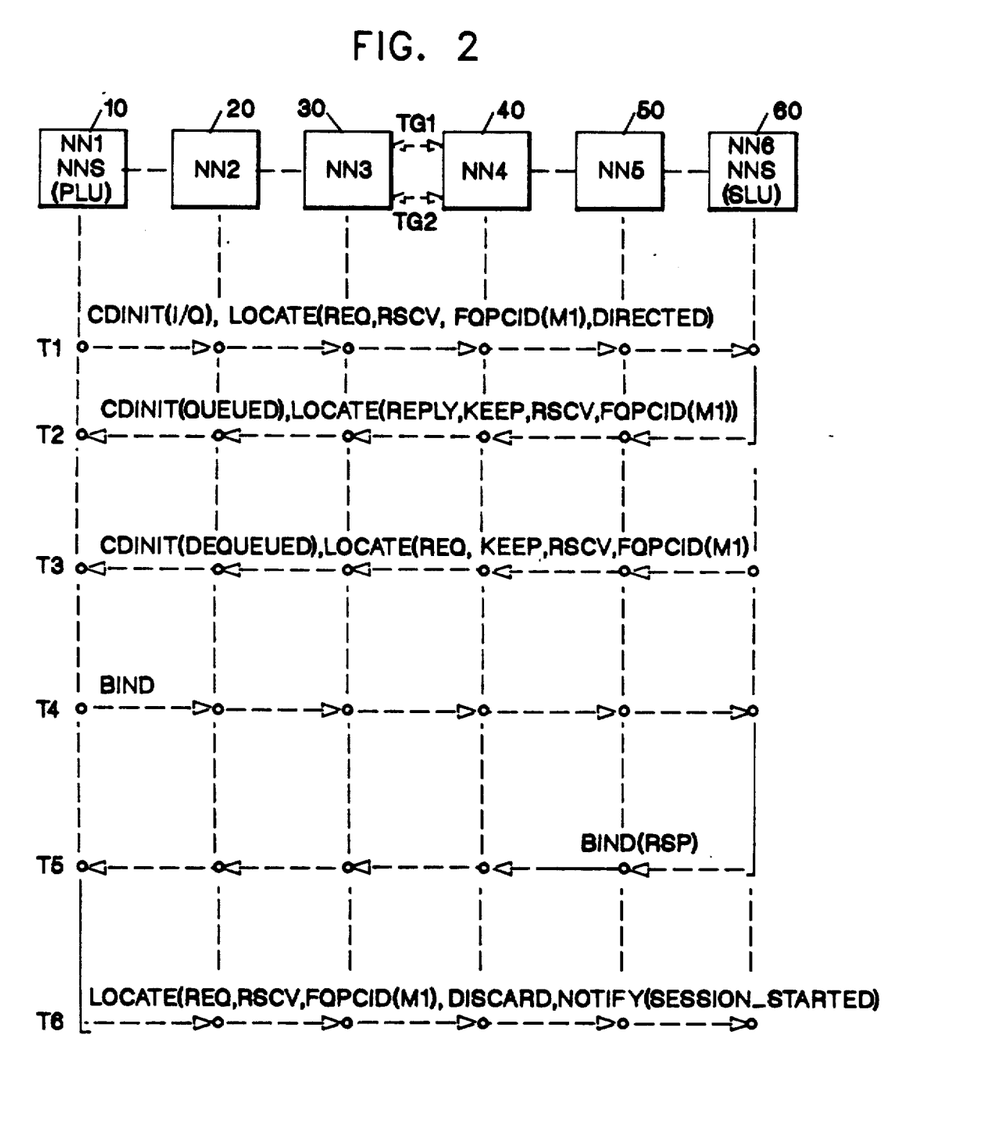
FIG. 2 is a flow diagram of the session initiation process wherein locate chains are used.

FIG. 2 depicts the typical chronology of messages that flow between an originating logical unit and a destination logical unit in a communications network during the session initiation process. A locate chain is maintained throughout the session initiation process. The locate chain exists from the network node server of the primary logical unit, NNS (PLU) 10, to the network node server of the secondary logical unit, NNS (SLU) 60. The intermediate network nodes 20, 30, 40, 50 that participate in the locate chain provide the connectivity between the NNS (PLU) 10 and the NNS (SLU) 60. These intermediate nodes must dedicate control block resources to the locate chain while it is in existence. The locate chain in the network uses the CP-CP session between the network nodes to transport data, and maintains a memory of the chain in each of the network nodes until a CDINIT/LOCATE message with a discard indicator set is sent along the chain. Thus, resources are dedicated to the session initiation in the intermediate network nodes for the entire period of time required for the session to be initiated which could be considerable for queued requests.

In FIG. 2, at time T1 a PLU in the domain of NN1 wants to initiate a session with a SLU in the domain of NN6. A CDINIT/LOCATE message is sent to NNS (SLU) 60. The NNS (PLU) 10 specified "I/Q" in the cross-domain session initiation request, i.e., either initiate the session or queue it if it is not possible to initiate the session immediately. In response, the SLU queued the session initiation. At time T2 NNS (SLU) 60 sent a CDINIT/LOCATE reply message with the "keep" indicator set indicating that the locate chain must be maintained. When the SLU has the necessary resources to initiate the session at time T3, the NNS (SLU) 60 sends another CDINIT/LOCATE message that specifies that the session initiation request has been dequeued and the session initiation process can continue. This is followed by the PLU sending a BIND message to the SLU at time T4, with a BIND response message being returned at time T5. After the PLU receives the BIND response message, the NNS (PLU) 10 sends a final LOCATE message with the "discard" indicator set to destroy the chain.

In the virtual chain approach, the locate chain is replaced with a virtual chain between the NNS (PLU) 10 and the NNS (SLU) 60. Intermediate network nodes 20, 30, 40 and 50 dedicate resources to the session initiation only while a CDINIT/LOCATE is being sent between the NNS (PLU) 10 and the NNS (SLU) 60. Once the virtual chain is set up, it is not destroyed until it becomes disconnected, the session is initiated successfully, or the session initiation is aborted.

The virtual chain is defined by the RSCV that is calculated between the NNS (PLU) 10 and the NNS (SLU) 60. Once the RSCV is calculated, it is saved at the NNS (PLU) 10 and used to route a directed CDINIT/LOCATE request to the NNS (SLU) 60. When the CDINIT/LOCATE arrives at the NNS (SLU) 60, the NNS (SLU) saves the RSCV. Upon receipt of the CDINIT/LOCATE reply from the NNS (SLU), the NNS (PLU) 10 knows that the NNS (SLU) 60 has received and stored the RSCV. At this point, the NNS (PLU) and the NNS (SLU) are using the same RSCV to represent the virtual chain. As the reply to the CDINIT/LOCATE traverses the route defined by the RSCV from the NNS (SLU) to the NNS (PLU), the locate chain between the network node servers is destroyed since the CDINIT/LOCATE reply contains a discard indicator.

During the existence of the virtual chain, it can be used to send additional CDINIT/LOCATE requests and replies concerning the session initiation between the NNS (PLU) 10 and the NNS (SLU) 60. The additional CDINIT/LOCATE requests can be sent with either the keep or discard indicator set. A sequence modifier to the FQPCID identifier is used by each network node server to differentiate the procedures started by the messages sent on the virtual chain.

Figure 3:
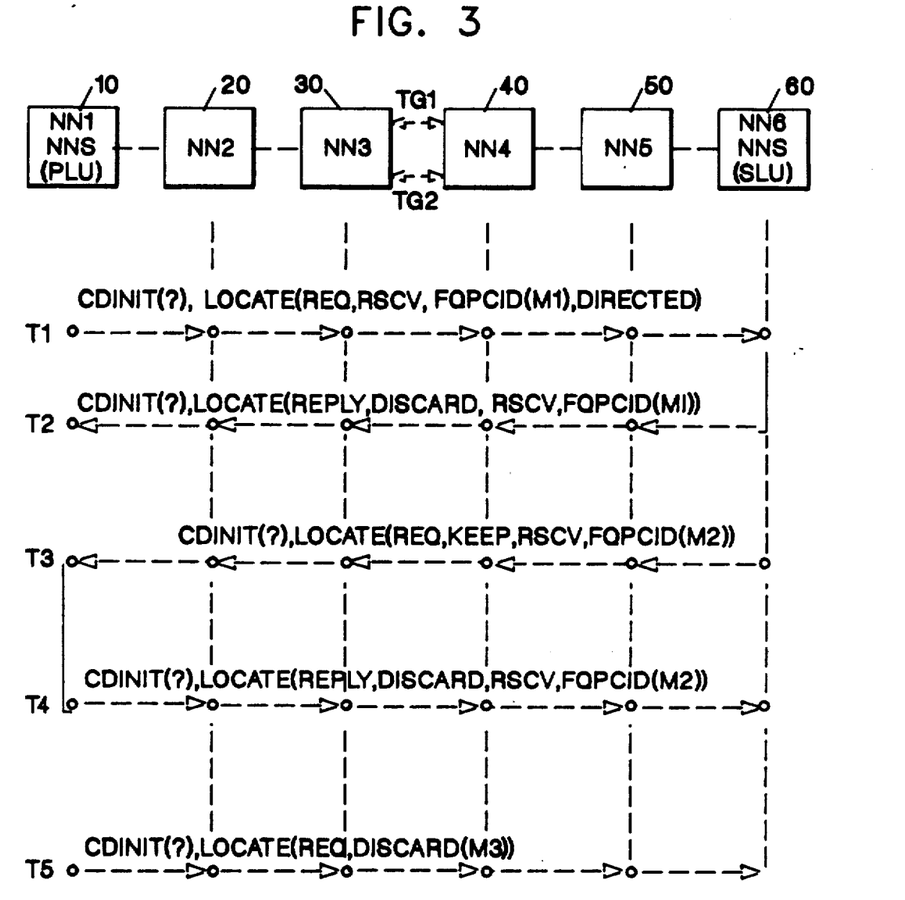
FIG. 3 is a flow diagram illustrating the concept of virtual chains in the session initiation process.

FIG. 3 illustrates the exchanging of CDINIT/LOCATE messages on a virtual chain. The NNS (PLU) 10 sends the initial session initiation command to the NNS (SLU) 60 at time T1. The keep indicator is set because a reply is required before the NNS (PLU) 10 can determine that the NNS (SLU) has the route selection control vector (RSCV) that allows the virtual chain to be set up at the NNS (SLU) 60. At time T2, the NNS (SLU) 60 replies to the initial session set-up command sent by the NNS (PLU) 10. Both sides now have the RSCV and the virtual chain is established. Both network node servers now monitor their respective topology databases for potential disconnection which will be described subsequently. The discard indicator is set so that the actual locate chain is discarded. At a later time T3, the NNS (SLU) 60 sends an additional session set-up command to the NNS (PLU) 10. In this instance, the discard indicator is set since a virtual chain is being maintained by the NNS(PLU). The NSS(PLU) 10 sends a reply to the additional session set-up command sent by the NNS(SLU) 60 at time T4 with the discard indicator set since the virtual chain is being maintained by the NNS(SLU). The discard indicator is set so that the locate chain is discarded. At time T5, another session set-up command is sent by the NNS (PLU) 10 to the NNS (SLU) 60. The discard indicator is set in a CDINIT/LOCATE request for which a reply is not required. Note that each of the CDINIT/LOCATE requests is uniquely identified by the FQPCID modifier. The replies use the same FQPCID modifier as the corresponding request.

Figure 4:
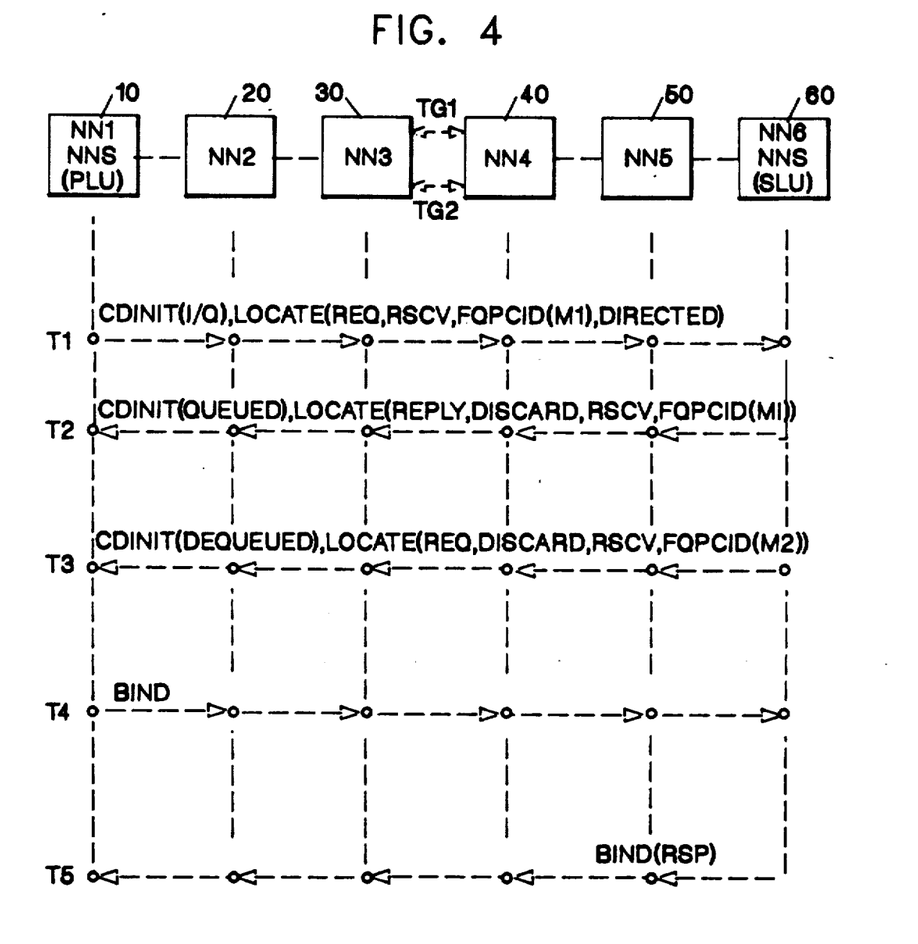
FIG. 4 is a flow diagram illustrating the use of virtual chains in a session initiation process in which session initiation requests can be queued.

The complete process of session initiation using virtual chains is illustrated in FIG. 4. A PLU in the domain of NN1 wants to initiate a session with a SLU in the domain of NN6. A CDINIT/LOCATE is sent at time T1 to NN6 which is a network node server for the SLU. The PLU specified "I/Q," i.e., either initiate the session immediately or queue the request. The SLU queued the session initiation request and the NNS (SLU) 60 sent the CDINIT/LOCATE response at time T2 with the discard indicator set specifying that the actual locate chain can be destroyed. At this point, both the NNS (PLU) 10 and NNS (SLU) 60 have the RSCV and the virtual chain is established. Once the SLU has the necessary resources to initiate the session at some later time T3, the NNS (SLU) 60 sends a CDINIT/LOCATE message specifying that the session initiation has been dequeued and that session initiation can continue. This message is sent with the discard indicator set, therefore, the intervening network nodes do not maintain a locate chain. At time T4, the PLU sends a BIND message to the SLU, to which the SLU responds at time T5 by sending a BIND RESPONSE message. After sending the BIND RESPONSE message, the NNS (SLU) 60 discards the virtual chain. After the PLU receives the BIND RESPONSE message, the NNS (PLU) 10 discards the virtual chain. It should be noted that no resources are used in intermediate network nodes 20, 30, 40 and 50 for the time period between T2 and T3, or for the time period after T3. When the discard indicator is set in the CDINIT/LOCATE message, resources are used in a network node only when the message is flowing through the node. When the keep indicator is set in the message, resources are used for the period of time required for the requests to reach the destination network node server and for the reply to return to the sending network node server.

The virtual chain is destroyed when the session is initiated successfully or aborted. When the network node server receives an indication from the logical unit in its domain that the session has been either initiated successfully or aborted, all resources dedicated to maintaining the virtual chain are freed.

After establishing a virtual chain, the network node servers for the primary and secondary logical units monitor their respective topology databases in order to detect potential disconnection of the virtual chain. A disconnection between logical units is considered potential since the topology update messages can arrive out of sequence causing the disconnection to be temporary and apparent, rather than real. The virtual chain is considered to be potentially disconnected when either of the following conditions occur:

1. The topology database of a network node server indicates that all transmission groups between any two adjacent nodes in the CDINIT/LOCATE route selection control vector are simultaneously inoperative during the session initiation defined by a FQPCID.
2. The topology database of a network node server indicates that all transmission groups between any two adjacent nodes in the CDINIT/LOCATE route selection control vector have become inoperative at some time during the session initiation defined by a FQPCID.

If the virtual chain is deemed to be potentially disconnected, the network node server discovering the potential disconnection sends a CDINIT/LOCATE message to the network node server with which it is engaged in session initiation. The message request will have the keep indicator set and will contain the RSC that defines the virtual chain. If the route defined by the virtual chain is disconnected, a negative reply is returned to the network node server sending the message request. The session initiation is then terminated and all resources dedicated to maintaining the session initiation are freed. On the other hand, if the route defined by the virtual chain is still active, the partner network node server will send a CDINIT/LOCATE reply with the discard indicator set. When the CDINIT/LOCATE exchange is completed, both nodes are synchronized again and memory of the potential disconnection between the affected network nodes can be removed from the topology database. If any transmission group between two nodes which has experienced potential disconnection is reported inoperative again, the potential disconnection algorithm is executed.

Figure 5:
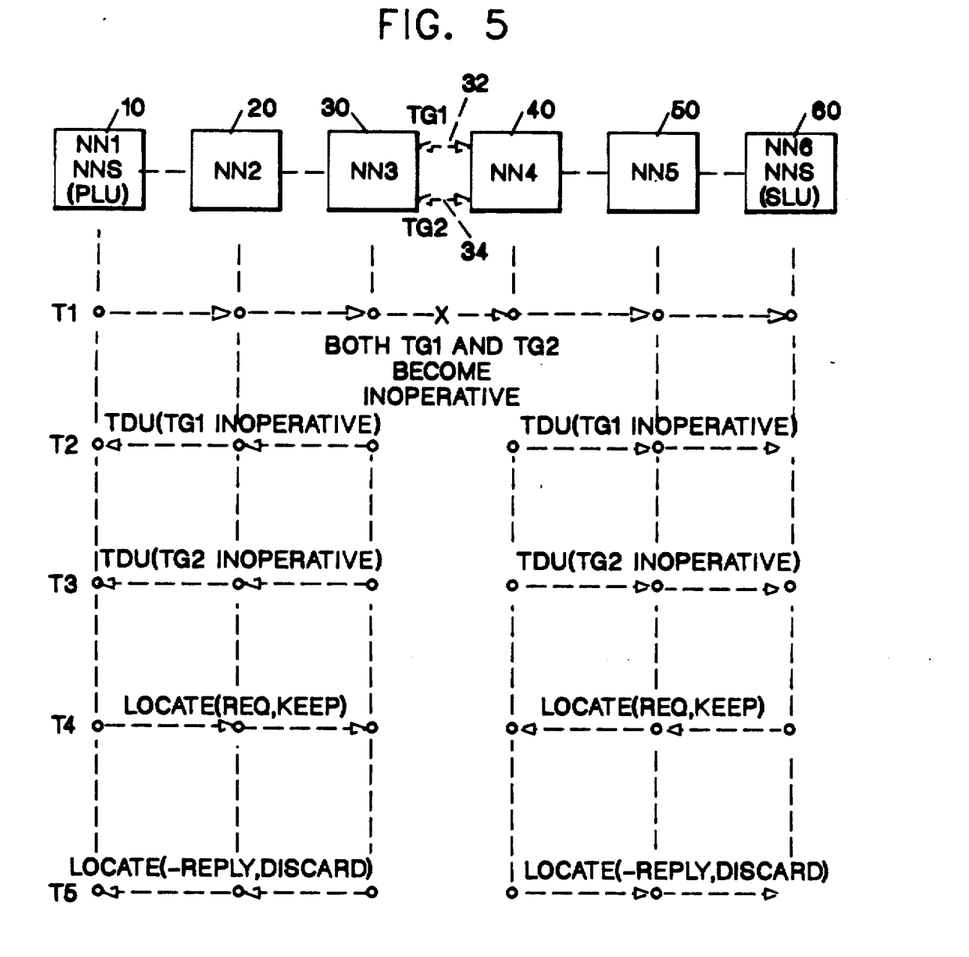
FIG. 5 is a flow diagram illustrating the session initiation process in which the virtual chain is potentially and actually disconnected at both network node servers.
Figure 6:
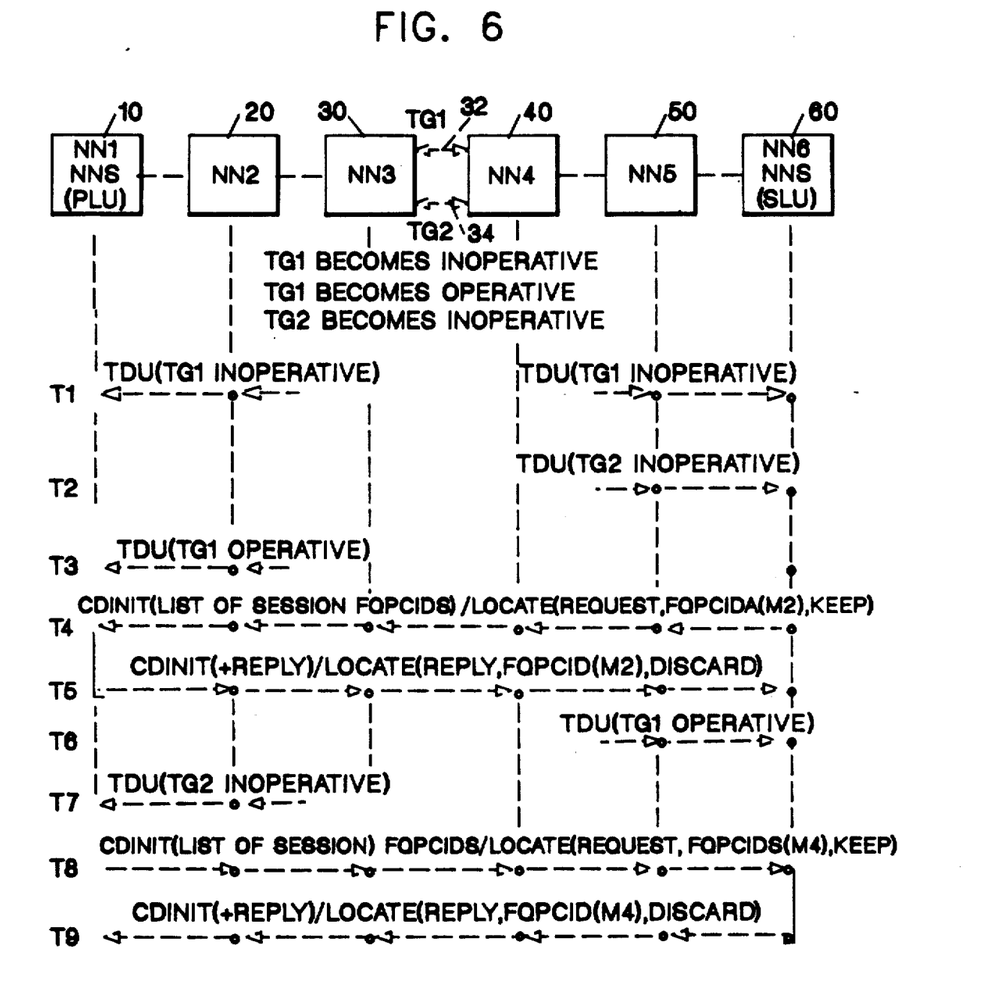
FIG. 6 is a flow diagram illustrating the session initiation process in which the virtual chain is potentially but not actually disconnected at the network node servers.

The two potential disconnection conditions are illustrated in FIGS. 5 and 6. Consider first the situation in FIG. 5 in which all connections between network nodes NN3 and NN4 are disconnected at time T2. While monitoring their respective topology databases at time T1, both NNS (PLU) 10 and NNS (PLU) 60 become aware that transmission group TG1, identified by reference numeral 32, is inoperative. Similarly, at time T3 both network node servers become aware that transmission group TG2, identified by reference numeral 34, is inoperative. At time T4, the topology databases of both network node servers indicate that all transmission groups between NN3 and NN4 are simultaneously inoperative during the session initiation defined by a FQPCID. Both NNS (PLU) 10 and NNS (SLU) 60 send locate messages to verify the potential disconnection. When a negative reply is received at time T5, nodes NN1 and NN6 remove all knowledge of the session initiation.

The second potential disconnection condition is illustrated in FIG. 6. At time T1, both network node servers are informed that transmission group TG1 between network nodes NN3 and NN4 is inoperative. The NNS (SLU) 60 is informed at time T2 that transmission group TG2 between NN3 and NN4 is inoperative. Because of the intervening network, the topology display update (TDU) messages arrive out of sequence. The NNS (SLU) 60 determines that the virtual chain is potentially disconnected. At time T3, the NNS (PLU) 10 is informed that transmission group TG1 between nodes NN3 and NN4 is operative. It has not yet received a TDU message on transmission group TG2. In response to the potential disconnection of the virtual chain, at time T4 NNS (SLU) 60 sends a CDINIT/LOCATE message to the network node server of the primary logical unit to determine if the disconnection is real. Since the TDUs arrived out of order, the disconnection was apparent and not actual. The virtual chain was maintained by the NNS (PLU) 10. A positive reply is sent to the NNS (SLU) 60 at time T5 and session activation continues uninterrupted. Memory of the potential disconnection is removed. If at any time following the synchronization TG1 or TG2 are again reported inoperative to NN6, NN6 will re-execute the potential disconnection algorithm. At time T6, the NNS (SLU) 60 is informed that transmission group TG1 between network nodes NN3 and NN4 is operative. This is followed at time T7 when NNS (PLU) 10 is informed that transmission group TG2 between NN3 and NN4 is inoperative. The NNS (PLU) 10 determines that a potential disconnection exists. The NNS (PLU) 10 sends a CDINIT/LOCATE message to the network node server of the secondary logical unit at time T8 to determine if the disconnection is real. Finally, at time T9, the TDUs are in order, and the disconnection was apparent, not actual. The virtual chain was maintained by NNS (SLU) 60. A positive reply is sent to the NNS (PLU) and session activation continues uninterrupted. Memory of the potential disconnection is removed. If at any time following the synchronization TG1 or TG2 are again reported inoperative to NN1, NN1 will re-execute the potential disconnection algorithm.

In using the virtual chain approach, only minimal chain control blocks are required at the intermediate network nodes for directed searches. The minimal chain control blocks contain only sufficient information to allow error recovery. They exist at the intermediate network nodes during the exchange of CDINIT/LOCATE requests and replies between the network node server for the originating logical unit and the network node server for the destination logical unit only when the virtual chain is being set up by the initial exchange of CDINIT/LOCATEs. The minimal chains at the intermediate network nodes will be taken down by the reply. The chain for the session setup exists in the virtual chain, and is taken down when session setup is complete. When the CDINIT/LOCATE request is sent from one network node server to the other, a minimal chain does not have to be maintained by the intermediate nodes. The true chain is kept at the two network node servers.

The above embodiment of virtual chains has been described in the context of sessions. Sessions are implemented through an exchange of session initiation messages. When the need for the connection is ended, another exchange of messages is required to terminate a session. In contrast, datagrams are simple messages that do not require the logical sessions to be established. Datagrams can arrive in a different order than the one in which they were sent. The virtual chain concept can also be used to implement datagrams, sending them on the CP-CP sessions. Since the datagram is not dependent on an immediate reply, a locate chain does not have to be created in the intermediate network nodes. Both the datagram and its confirmation will flow without building a chain. This gives the peer-to-peer network the function of a connectionless network since no session is established to deliver the datagram or its reply.

While the invention has been particularly shown and described with reference to the particular embodiment thereof, it will be understood by those skilled in the art that various changes in form and details may be made therein without departing from the spirit and scope of the invention.

Having thus described our invention, what we claim and desire to secure as Letters Patent is as follows:

1. A method for establishing and maintaining a virtual chain between a pair of communicating server nodes in a computer network during session initiation, the computer network containing a plurality of network nodes, server nodes and end nodes wherein each network node and server node is an information processing system having at least a processor and a memory and maintains a topology database and allocates control blocks to said session initiation, said method comprising the steps of:
   generating a first session initiation request by a processor in a first communicating server node;
   sending the first session initiation request from the first communicating server node to a second communicating server node along a session initiation path of intermediate network nodes determined by the processor at the first communicating server node;
   allocating control blocks for session initiation at the first and second communicating server nodes and at the intermediate network nodes by a processor at each server node and intermediate network node in response to said first session initiation request, said allocated control blocs representing a real chain between said pair of communicating server nodes;
   queuing said first session initiation request by the processor at said second communicating server node if the processor at said second communicating server node does not have the resources available to complete session initiation;
   returning a first reply generated by a processor at said second communicating server node to the first session initiation request from said first communicating server node along said session initiation path of network nodes, said first reply including an indication that said first session initiation request is being queued;
   deallocating the control blocks for session initiation by the processor located at each of said intermediate network nodes in response to said first reply immediately after forwarding said first replay to the next network node along the session initiation path, with the control blocks remaining allocated at each communicating server node after said first reply is received at said first communicating server node representing a virtual chain;
   generating and sending additional session initiation requests and replies between said pair of communicating server nodes as required to complete session initiation;
   monitoring topology update messages by the processor at each communicating server node for a plurality of potential disconnect conditions along said session initiation path following the deallocation of control blocks at each intermediate network node; and
   deallocating the control blocks for session initiation at each communicating server node to discard the virtual chain after session initiation is complete.

2. The method of claim 1 including the steps of detecting one of a plurality of potential disconnect conditions by the processor at one of said communicating server nodes; and generating and sending an additional session initiation request to the other communicating server node to determine if there is an actual disconnection between any adjacent network nodes along the session initiation path.

3. The method of claim 2 wherein said first potential disconnect condition occurs when all the transmission groups between any two adjacent nodes along the session initiation path of network nodes are simultaneously inoperative.

4. The method of claim 2 wherein said second potential disconnect condition occurs when all the transmission groups between any two adjacent nodes along the session initiation path of network nodes have become inoperative at some time during session initiation.

5. The method of claim 3 including the steps of generating a reply by a processor at an intermediate network node along the path for session initiation in response to said additional session initiation request when the processor at said intermediate network node determines that the network node is disconnected from the adjacent node along the path; sending the reply back to the communicating server node that sent the additional session initiation request along the path for session initiation; and deallocating all control blocks for session initiation by the processor at the communicating server node that sent the additional session initiation request.

6. The method of claim 4 including the step of removing any memory of the potential disconnect condition between said adjacent nodes along the session initiation path when the processor at said other communicating server node sends a reply to said one communicating server node in response to said additional session initiation request.

7. A method for establishing and maintaining a virtual chain between a pair of communicating server nodes in a computer network during the initiation of a communication session between logical units in the corresponding domains of said communicating server nodes, said computer network having a plurality of server nodes, end nodes and network nodes wherein each network node and server node is an information processing system having at least a processor and a memory and maintains a topology database and allocates control blocks to said initiation of a communication session, said method comprising:

selecting a path of intermediate network nodes for session initiation by a processor at a first communicating server node that terminates at a second communicating server node;

storing said path for session initiation in control blocks allocated at said first communicating server node;

generating and sending a first session initiation request by the processor at said first communicating server node to said second communicating server node along said selected path of intermediate network nodes for session initiation wherein said first request contains a vector identifying said selected path;

allocating control blocks for session initiation at the intermediate network nodes by a processor at each intermediate network node in response to said first session initiation request, said allocated control blocks at the intermediate network nodes representing a real chain between said pair of communicating server nodes;

receiving said first session initiation request by a processor and storing said selected path in control blocks allocated at said second communicating server node;

queuing said first session initiation request by the processor at said second communicating server node if the processor at said second communicating server node does not have the resources available to complete session initiation;

sending a first response to the first session initiation request from the processor at said second communicating server node to said first communicating server node along said selected path of intermediate network nodes, said first response including an indication that said first session initiation request is being queued;

deallocating the control blocks for session initiation by the processor at each of said intermediate network nodes immediately after said first response is forwarded to the next network node along the selected path for session initiation, with the control blocks remaining allocated at each communicating server node after said first response is received at said first communicating server node representing a virtual chain;

generating and sending additional session initiation requests and replies between said pair of communicating server nodes as required to complete session initiation;

monitoring topology update messages by the processor at each communicating server node path for a plurality of potential disconnect conditions following the deallocation of control blocks at each intermediate network node; and deallocating the control blocks for session initiation at each communicating server node to discard the virtual chain after session initiation is complete.

8. The method of claim 7 including the step of generating and sending an additional session initiation request by the processor at one of said communicating server nodes to the other communicating server node when the one communicating server node detects the potential disconnect condition that all transmission groups between any pair of adjacent network nodes along said selected path have become inoperative during the initiation of the communication session, said addition session initiation request being sent to determine if there is an actual disconnection between any adjacent network nodes.

9. The method of claim 8 further including the steps of generating a response to said additional session initiation request by the processor at an intermediate network node along the path for session initiation when the processor at said intermediate network node determines that the intermediate network node is disconnected from the adjacent node along the path; sending the response back to the communicating server node that sent the additional session initiation request along the path for session initiation; and deallocating all control blocks for session initiation by the processor at the communicating server node that sent the additional session initiation request.

10. The method of claim 8 further including the step of continuing the initiation of the communication session if said other communicating server node sends a reply to the one communicating server node in response to the additional session initiation request indicating that at least one transmission group remains active between each pair of adjacent network nodes.

11. A system for establishing and maintaining a virtual chain between a pair of communicating server nodes in a computer network during the initiation of a communication session between logical units in the corresponding domains of the communicating server nodes, said computer network having a plurality of server nodes, end nodes and network nodes wherein each network node and server node is an information processing system having at least a processor and a memory and maintains a topology database, said system comprising:

means at a first communicating server node for selecting a path for session initiation that passes through a succession of interconnected network nodes to a second communicating server node;

means for allocating control blocks for session initiation at each interconnected network node and at the communicating server nodes along the selected path, said allocated control blocks forming a real chain between said pair of communicating server nodes;

means, cooperative with said means for allocating, for storing said selected path in the allocated control blocks at the first communicating server node, and at the second communicating server node;

means at each communicating server node, cooperative with said means for selecting and said means for storing, for generating and sending a plurality of session initiation requests to said other communicating server node along said selected path;

means at each communicating server node, responsive to a first of said plurality of session initiation requests, for queuing the first session initiation request if the processor at said each communicating server node does not have the resources available to complete session initiation;

means at each communicating server node, responsive to said plurality of session initiation requests, for generating and sending a plurality of session initiation replies to said other communicating server node in response to said plurality of session initiation requests, a first of said plurality of session initiation replies including an indication that said first session initiation request is being queued;

means at each interconnected network node, responsive to the first of said plurality of session initiation replies, for deallocating the control blocks that had been allocated for session initiation at each of the interconnected network nodes after forwarding the first session initiation reply to the next interconnected node along said selected path, the control blocks remaining allocated at each communicating server node forming a virtual chain;

means, at each communicating server node cooperative with said means for storing, for monitoring topology update messages for the detection of a plurality of potential disconnect conditions along said selected path following the deallocation of control blocks at said interconnected network nodes; and means at each communicating server node, cooperative with said means for monitoring and responsive to said plurality of session initiation requests and said plurality of session initiation replies, for deallocating the control blocks for session initiation at each communicating server node to discard the virtual chain after session initiation is complete.

12. The system of claim 11 further including means at each of said interconnected network nodes along said selected path for communication and cooperative with said means for generating and sending said plurality of session initiation requests, for generating and sending a response to the one of said communicating server nodes that generated and sent a session initiation request that any of said interconnected network nodes cannot forward to the adjacent interconnected network node along said selected path.

13. The system of claim 12 further including means for deallocating control blocks for session initiation at each of the communicating server nodes that is responsive to the receiving of said response that was generated and sent from one of said interconnected network nodes along said selected path for communication.

* * * * *